United States Patent
Daum et al.

(10) Patent No.: US 7,820,134 B2
(45) Date of Patent: Oct. 26, 2010

(54) PROCESS AND PLANT FOR PRODUCING SULFURIC ACID

(75) Inventors: Karl-Heinz Daum, Mainz (DE); Wolf-Christoph Rauser, Frankfurt am Main (DE)

(73) Assignee: Outotec Oyj, Espoo (FI)

( * ) Notice: Subject to any disclaimer, the term of this patent is extended or adjusted under 35 U.S.C. 154(b) by 523 days.

(21) Appl. No.: 10/592,290

(22) PCT Filed: Feb. 19, 2005

(86) PCT No.: PCT/EP2005/001741

§ 371 (c)(1),
(2), (4) Date: Aug. 23, 2007

(87) PCT Pub. No.: WO2005/095272

PCT Pub. Date: Oct. 13, 2005

(65) Prior Publication Data

US 2008/0253957 A1   Oct. 16, 2008

(30) Foreign Application Priority Data

Mar. 12, 2004 (DE) .................. 10 2004 012 293

(51) Int. Cl.
  *C01B 17/69* (2006.01)
  *C01B 17/74* (2006.01)
(52) U.S. Cl. .................. 423/522; 423/528
(58) Field of Classification Search .......... None
See application file for complete search history.

(56) References Cited

U.S. PATENT DOCUMENTS

| | | | |
|---|---|---|---|
| 2,180,727 A | 11/1939 | Carter | 23/175 |
| 2,655,431 A | 10/1953 | Allen et al. | 23/168 |
| 3,490,868 A | 1/1970 | Furkert | 23/168 |
| 3,780,499 A | 12/1973 | Dorr et al. | 55/32 |
| 3,788,043 A | 1/1974 | Dorr et al. | 55/237 |
| 3,875,294 A | 4/1975 | Reh et al. | 423/534 |

(Continued)

FOREIGN PATENT DOCUMENTS

DE   1054431   4/1959

(Continued)

OTHER PUBLICATIONS

Sander, Ulrich, Rothe, Ulrich and Kola, Rolf. "Ullmann's Encyclopedia" British Sulphur Corporiation. 4th ed., (1984).*

(Continued)

*Primary Examiner*—Melvin C Mayes
*Assistant Examiner*—Sheng Han
(74) *Attorney, Agent, or Firm*—Leydig, Voit & Mayer, Ltd.

(57) ABSTRACT

There are described a process and a plant for producing sulfuric acid by catalytic oxidation of $SO_2$ to $SO_3$ and subsequent absorption of $SO_3$ in sulfuric acid, wherein the $SO_3$ is introduced into a first absorption stage and absorbed there in concentrated sulfuric acid, wherein the sulfuric acid having a higher concentration due to the absorption is passed through a heat exchanger and cooled, and wherein the non-absorbed $SO_3$ is supplied to a second absorption stage for the further absorption in sulfuric acid. Before the first absorption stage a partial stream of $SO_3$ is branched off and supplied directly to the second absorption stage.

8 Claims, 3 Drawing Sheets

U.S. PATENT DOCUMENTS

| | | | | |
|---|---|---|---|---|
| 3,907,979 | A | | 9/1975 | Jennings ................... 423/522 |
| 4,212,855 | A | * | 7/1980 | Kerner et al. ............... 423/522 |
| 4,285,927 | A | | 8/1981 | Hara et al. |
| 4,368,183 | A | | 1/1983 | Dorr et al. .................. 423/522 |
| 4,996,038 | A | | 2/1991 | McAlister et al. ........... 423/522 |
| 5,194,239 | A | * | 3/1993 | Masseling et al. ........... 423/522 |
| 5,308,587 | A | | 5/1994 | Cameron ................... 422/160 |
| 5,593,652 | A | | 1/1997 | Peng .......................... 423/522 |
| 6,153,168 | A | * | 11/2000 | Seitz et al. .................. 423/522 |
| 6,279,514 | B1 | | 8/2001 | Browder et al. ................. 122/7 |
| 6,500,402 | B1 | | 12/2002 | Winkler et al. .............. 423/522 |
| 6,627,172 | B1 | * | 9/2003 | Wagner et al. .............. 423/522 |

FOREIGN PATENT DOCUMENTS

| | | |
|---|---|---|
| DE | 30303 | 10/1963 |
| DE | 1567716 | 7/1970 |
| DE | 20 50 580 | 4/1972 |
| DE | 2 223 131 | 5/1972 |
| DE | 22 13 580 A1 | 3/1975 |
| DE | 28 20 231 | 5/1978 |
| DE | 15 67 716 | 7/1979 |
| DE | 30 00 599 | 7/1980 |
| DE | 29 45 021 | 5/1981 |
| DE | 33 03 289 | 8/1984 |
| DE | 691 05 961 | 10/1991 |
| DE | 19522 927 | 1/1997 |
| DE | 198 00 800 | 7/1999 |
| EP | 0218411 | 4/1987 |
| GB | 21 81 120 A | 4/1987 |
| WO | WO 91/14651 | 10/1991 |
| WO | WO 2004/037719 | 5/2004 |

OTHER PUBLICATIONS

Connock, L., "Systems for Enhanced Energy Recovery", *Sulphur*, Sulphuric Acid Technology, British Sulphur Publishing Co, London, GB, No. 278, pp. 41-47 (Jan.-Feb. 2002) XP-001075186.

Elvers, B. Ullmann's Encyclopedia of Industrial Chemistry; vol. A 25, Sulfuric Acid and Sulfur Trioxide 655-668 1992.

Derwent Publications Ltd. An 2002-032802, XP002269015 & RU 2174 945, Abstract Oct. 20, 2001.

U.S. Appl. No. 11/579,435, filed Aug. 21, 2007, Karl-Heinz Daum et al.

U.S. Appl. No. 11/816,693, Karl-Heinz Daum.

* cited by examiner

PROCESS AND PLANT FOR PRODUCING SULFURIC ACID

This application claims the benefit of International Application No. PCT/EP2005/001741 filed on Feb. 19, 2005 under 35 U.S.C. §371, entitled, "Process and Plant for Electrodepositing Copper" which claims the benefit of German Patent Application No. 10 2004 012 293.8 filed on Mar. 12, 2004.

FIELD OF THE INVENTION

This invention relates to a process and a plant for producing sulfuric acid by catalytic oxidation of $SO_2$ to $SO_3$ and subsequent absorption of $SO_3$ in sulfuric acid, wherein the $SO_3$ is introduced into a first absorption stage and absorbed there in concentrated sulfuric acid, wherein the sulfuric acid, which has a higher concentration due to the absorption, is passed through a heat exchanger and cooled, and wherein the non-absorbed $SO_3$ is supplied to a second absorption stage for further absorption in sulfuric acid.

The production of sulfuric acid usually is effected by what is called the double absorption process as it is described in Ullmann's Encyclopedia of Industrial Chemistry, 5th edition, Vol. A 25, pp. 635 to 700. Sulfur dioxide ($SO_2$) obtained by combustion of sulfur or as waste gas of metallurgical plants is converted in a four- or five-stage converter by means of a solid catalyst, for instance with vanadium pentoxide as active component, to obtain sulfur trioxide ($SO_3$). The $SO_3$ obtained is withdrawn after the contact stages of the converter and supplied to an intermediate absorber or, after the last contact stage of the converter, to a final absorber in which the gas containing $SO_3$ is countercurrently supplied to concentrated sulfuric acid and absorbed in the same.

The absorption of $SO_3$ in sulfuric acid is an exothermal process, in which a great amount of heat is released, which conventionally is supplied to the cooling water as waste heat via a cooling circuit. To exploit part of the heat obtained during the absorption, it is known to operate the intermediate absorber with elevated acid temperatures. While conventional absorbers are irrigated with acid temperatures between 60° C. and 90° C., the $SO_3$ is absorbed in concentrated sulfuric acid with a temperature between 160° C. and 180° C. in the so-called hot absorbers. The hot acid is passed through a heat exchanger, in which it is cooled by producing low-pressure steam. A partial stream of the acid is discharged (product acid), while the rest is recirculated to the absorber for producing more sulfuric acid. The gas leaves the absorber through a gas-conduit into the converter.

The hot absorption in accordance with the process of Outokumpu is performed in a Venturi absorber (primary absorber) upstream of the conventional intermediate absorber. The gas containing $SO_3$ is cocurrently passed through the Venturi system. $SO_3$ not absorbed in the Venturi system is passed through a gas conduit into the downstream intermediate absorber (secondary absorber), where it is countercurrently absorbed in concentrated acid at conventional temperatures.

Other processes likewise perform the hot absorption in two stages, but in only one apparatus. The gas containing $SO_3$ is countercurrently passed through the hot absorber tower. Here, the two absorption stages consist of two irrigation systems disposed one above the other. $SO_3$ not separated in the first stage is absorbed in the second stage and recirculated to the first stage as sulfuric acid.

What all systems have in common is the fact that the amount of $SO_3$ each separated in the respective stages depends on physical conditions (temperature, concentration, etc.) and cannot be influenced from outside or only to a very limited extent.

To maximize the steam recovery in these heat recovery plants, the dilution of the hot acid is exclusively performed with process water. The water obtained by drying the air in a drying tower for the combustion air must accordingly be used for reaction with the $SO_3$ obtained in the intermediate absorber and in the final absorber. In times of high air humidity it can happen that more water is obtained by drying the air than is necessary for the corresponding reaction with the $SO_3$ obtained in the intermediate absorber and in the final absorber. This is the case in particular when a highly concentrated (>98.5%) acid should be produced.

To avoid a dilution of the product acid, a transfer of the excess water from the other circuits into the hot absorber therefore is necessary. The concept of existing heat recovery plants (for instance Outokumpu HEROS) therefore provides an exchange of acid between the individual circuits. For this purpose, the hot absorber circuit must be operated with a higher concentration than the other circuits. Tight restrictions are, however, placed on the choice of the concentration, as small deviations from the ideal concentration (98.3 to 98.5%) already have negative consequences for the absorption capacity of the acid.

The smaller the difference in concentration between the circuits, the more acid must be exchanged. When the hot absorber circuit is operated for instance with 99% acid and the remaining circuits with 98.5% acid, only 0.5% of the amount is available for transferring the water. This means that for shifting 1 kg of water into the hot absorber, 200 kg of acid must be transported to the same. About the same amount then must be recirculated from the hot absorber circuit to the original circuit. The enormous amounts of acid necessary for this purpose not only require correspondingly dimensioned pipe conduits, pumps, etc., but in addition the hot acid is cooled in the hot absorber circuit by the exchange with cold acid, and hence the steam production is deteriorated correspondingly. (FIG. 1 shows the connection between the dew point and the specific low-pressure steam production.) To avoid this, one tries to keep the concentration difference as large as possible, in order to reduce the amounts to be transported.

Since the partial pressure of the water of sulfuric acid greatly increases below the azeotropic point (98.3%) (cf. FIG. 2), it is not possible to operate the absorbers with concentrations below this point. Otherwise, an increased formation of mist would have to be expected. Therefore, merely the circuit of the drying tower can be operated with acid having a higher dilution (cf. FIG. 3). The minimum concentration is determined by the corrosiveness of the acid, which is increasing with decreasing concentration, and by the partial pressure of steam.

To minimize the entrance of water into the sulfuric acid plant, the partial steam pressure of the drier acid must be minimized. This is only possible by a corresponding adjustment of the temperature, i.e. the lower the concentration of the acid, the lower the acid temperature must be maintained. The gas leaving the drying tower is introduced into the furnace by means of the blowers and is used in the furnace as combustion air for the sulfur. The lower the temperature of the air entering the furnace, the lower the combustion temperature and hence the steam production in the high pressure steam waste heat boiler downstream of the furnace. Thus, there is a direct connection between the chosen acid concentration in the drying tower and the amount of high pressure steam produced. With decreasing concentrations in the drying tower, the amounts of acid exchanged between the drier circuit and the hot absorber circuit are decreasing, but on the other hand the amount of high-pressure steam produced is reduced and the amount of heat to be dissipated to the cooling water is increased.

SUMMARY OF THE INVENTION

Therefore, it is the object underlying the invention to overcome the above-mentioned disadvantages and make the heat recovery du ring the production of sulfuric acid more efficient.

In accordance with the invention, this object substantially is solved in that before the first stage of the intermediate absorption, i.e. the primary absorber, a partial stream of the $SO_3$ is branched off and directly supplied to another absorption stage, in particular the secondary absorber.

Therefore, it is no longer necessary to perform an exchange of acid between the circuits. Instead of the acid (or water) the $SO_3$ is now shifted from one circuit into the other. This eliminates the risk of an uncontrolled dilution of acid even with extreme deviations of the air humidity from the design point. Pumps and pipe conduits no longer have to be designed for the worst case of air humidity.

In accordance with the invention, at least part of the sulfuric acid stream cooled in the heat exchanger is recirculated to the primary absorber, the same preferably being diluted to the desired concentration with process water.

When the process is used in connection with the production of $SO_2$ by combustion of sulfur, the drying tower, in which the air used as combustion air is dried by means of sulfuric acid, is operated with the same sulfuric acid concentration as the absorbers, in accordance with a preferred aspect of the invention. The drying tower can be operated with higher acid concentrations and hence higher acid temperatures, so that the yield of high-pressure steam is increasing and the cooling circuit is relieved.

In accordance with a preferred embodiment of this invention, the absorbers and the drying tower are supplied with sulfuric acid via a common storage tank.

In a plant for producing sulfuric acid in accordance with the invention the partial stream of $SO_3$ supplied directly to the secondary absorber is branched off via a bypass conduit, which branches off from the $SO_3$ supply conduit before the primary absorber and is coupled to the secondary absorber.

In accordance with the invention, the bypass conduit includes a valve for adjusting the partial stream of $SO_3$ passed by the primary absorber.

In accordance with the invention, the absorber and the drying tower are coupled to a common storage tank for supplying sulfuric acid. Since the plan t is simplified in terms of apparatus, costs are decreased.

The invention will subsequently be explained in detail with reference to an embodiment and the drawing. All features described and/or illustrated in the drawing form the subject-matter of the invention per se or in any combination, independent of their inclusion in the claims or their back-reference.

DESCRIPTION OF THE PREFERRED EMBODIMENT

Figure 1:
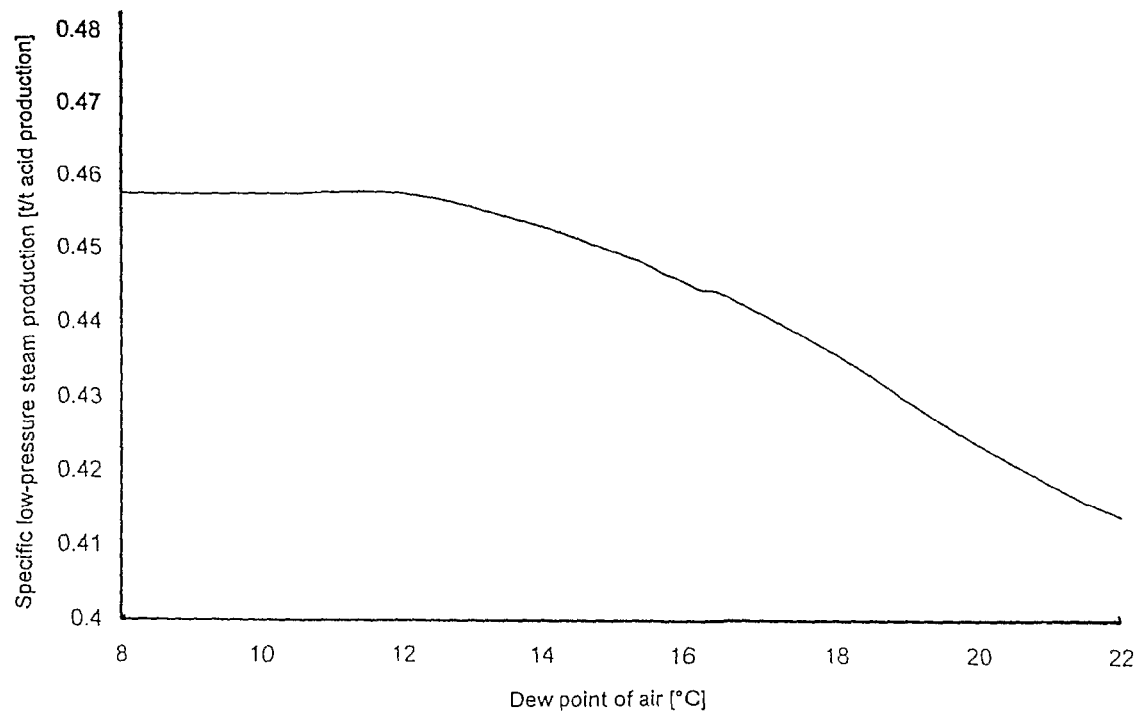
FIG. 1 shows the dependence of the steam production on the dew point of air.
Figure 2:
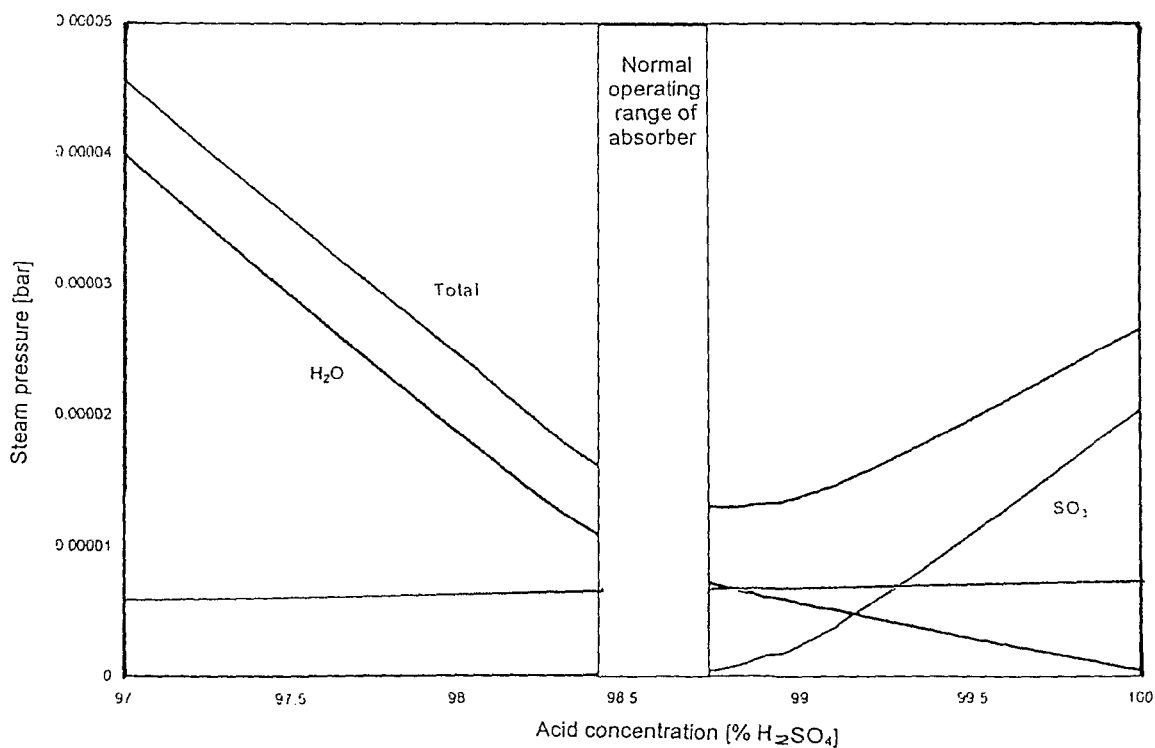
FIG. 2 shows the operating range of an absorber in view of the dependence of the steam pressure on the acid concentration.
Figure 3:
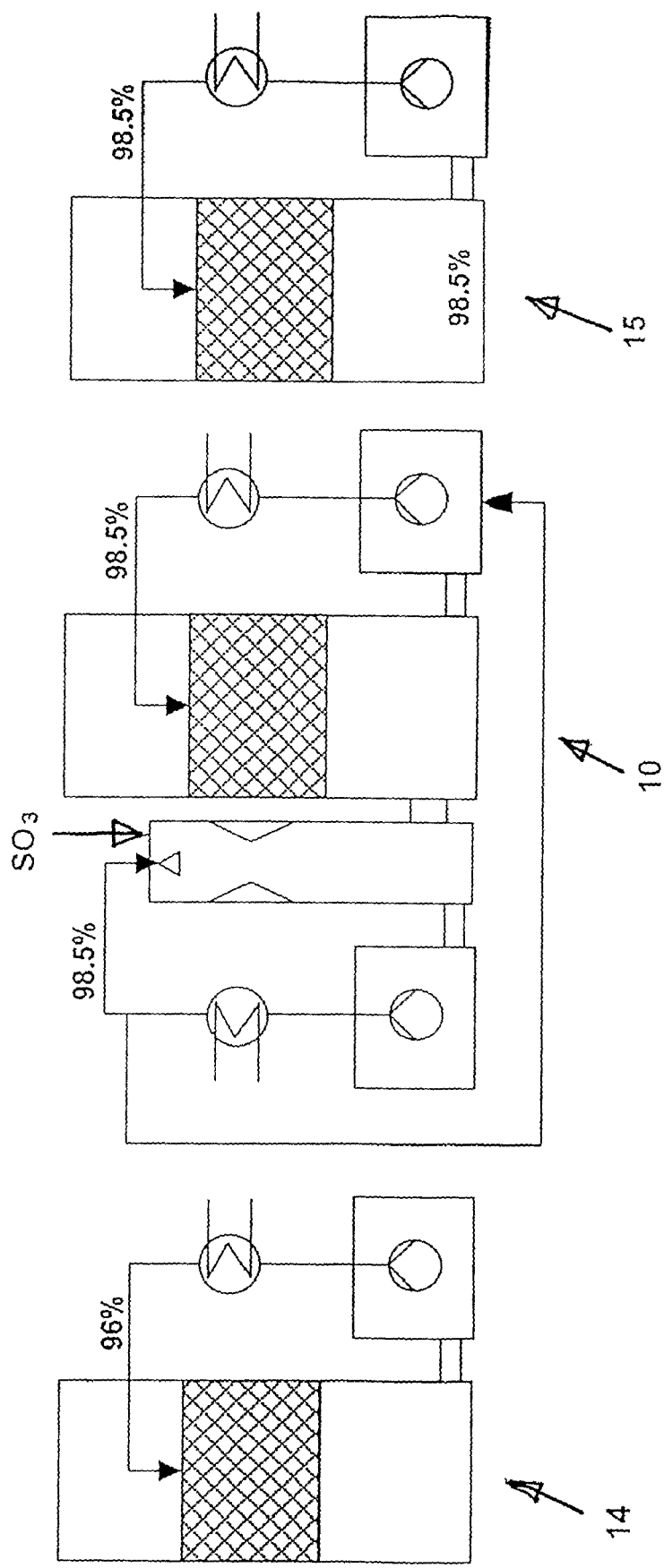
FIG. 3 schematically shows a conventional plant for producing sulfuric acid with separate acid circuits for absorber and drying tower.
Figure 4:
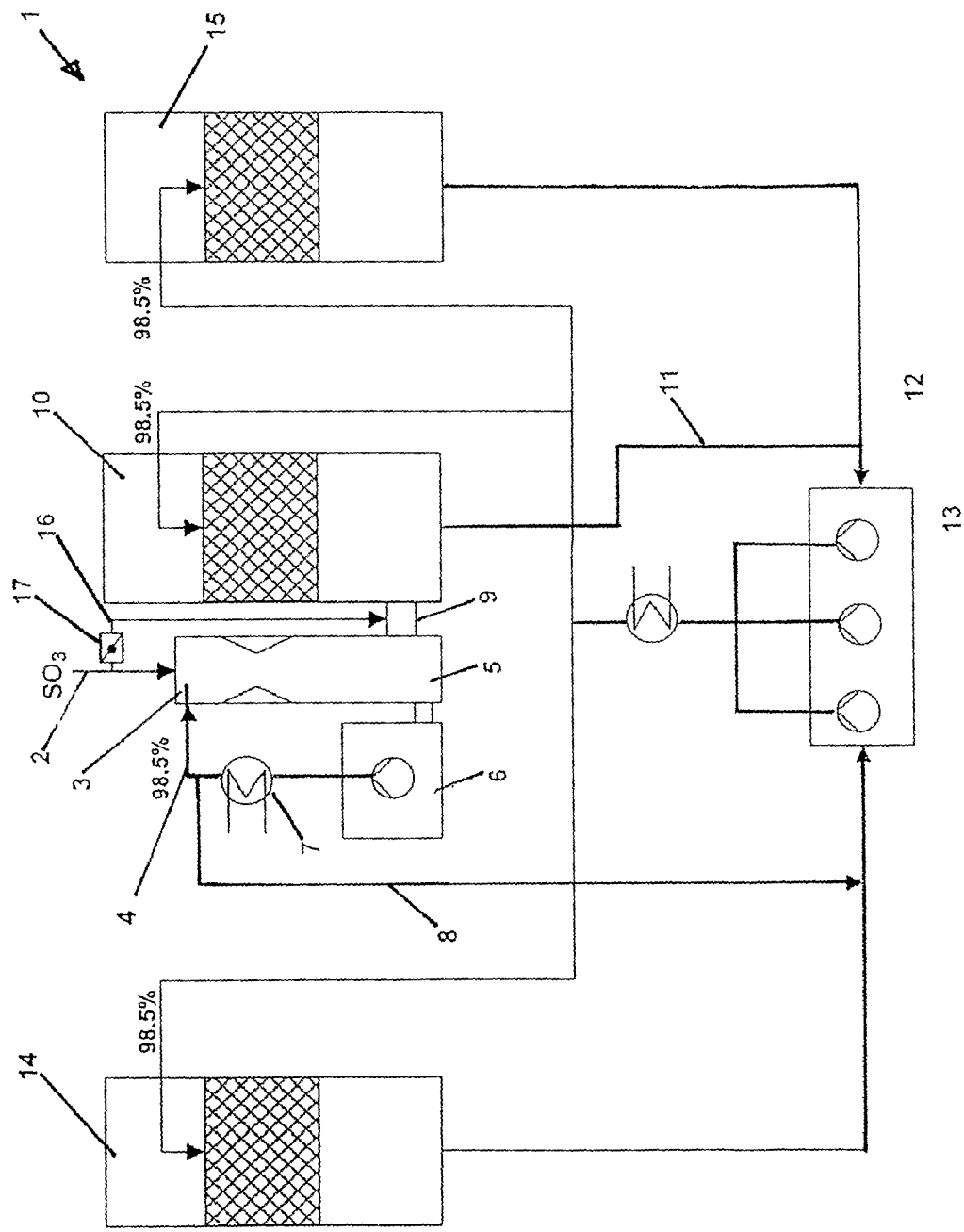
FIG. 4 schematically shows a plant for producing sulfuric acid by the process of the invention.

In the plant 1 for producing sulfuric acid in accordance with the invention, which is schematically illustrated in FIG. 4, $SO_3$, which was produced in a converter in a known manner by catalytic oxidation of $SO_2$, is supplied via a supply conduit 2 to a primary absorber (hot absorber) 3 constituting a Venturi absorber in accordance with a preferred embodiment, which absorber is traversed by $SO_3$ cocurrent with concentrated sulfuric acid (98.5%) supplied via conduit 4. At temperatures >140° C., $SO_3$ largely is absorbed by the sulfuric acid. The sulfuric acid, which due to the absorption has a higher concentration, is collected in the sump 5 of the primary absorber 3, withdrawn via a pump 6, and cooled in a heat exchanger 7 by generating steam. Part of the sulfuric acid then is discharged into a pump tank 12 via conduit 8, while the rest is recirculated to the primary absorber 3 via conduit 4 for again absorbing $SO_3$. Instead of the Venturi absorber shown, there can also be used an irrigation system in which the gas containing $SO_3$ flows countercurrently.

The gaseous $SO_3$ not absorbed in the primary absorber 3 flows through the gas conduit 9 into the secondary absorber 10, in which the $SO_3$ is absorbed in countercurrently flowing sulfuric acid (98.5%). The obtained sulfuric acid having a higher concentration is supplied to the pump tank 12 via conduit 11.

Via one or more pumps 13, the pump tank 12 feeds the intermediate absorber 10, a drying tower 14 for drying air which is subsequently used for the combustion of sulfur, and a final absorber 15 in which the $SO_3$ leaving the final stage of the non-illustrated converter is absorbed in sulfuric acid (98.5%).

The absorbers 10, 15 and the drying tower 14 are supplied with sulfuric acid of the same concentration via the common pump tank 12.

Before the primary absorber 3, a bypass conduit 16 is branched off from the supply conduit 2, via which bypass conduit a partial stream of the gas containing $SO_3$ passes by the primary absorber 3 to be supplied directly to the secondary absorber 10. For this purpose, the bypass conduit opens into conduit 11, via which the $SO_3$ not absorbed in the primary absorber 3 is supplied to the secondary absorber 10. In principle, the partial stream of $SO_3$ branched off can also be supplied to rioter absorption stage or to the final absorber.

In the bypass conduit 16 a control valve 17 is provided, by means of which the amount of $SO_3$-containing gas stream passing by the primary absorber 3 can be adjusted.

Instead of the acid (or water) shifted between the circuits in accordance with the prior art, the $SO_3$ now is shifted from one circuit to the other. Thus, the masses to be exchanged are very much smaller, and the pumps and pipe conduits can be dimensioned smaller. In addition, there is no risk of an uncontrolled dilution of acid even with extreme deviations of the air humidity from the design point.

In plants in which the recovery of low-pressure steam is effected in a plurality of low pressure steam boilers, it is now possible to continue the operation of the plant if one of the boilers is damaged. In this case, only so much $SO_3$ is introduced into the primary absorber 3 as can be processed by a single boiler. The rest is introduced into the secondary absorber 10 and absorbed there. Due to a corresponding design of the cooling circuit, the plant is able to continue operation under full load and by recovering 50% of the amount of low-pressure steam, even if one low-pressure boiler should fail.

The amount of low-pressure steam produced can be controlled. Should the consumers of low-pressure steam fail, it is not necessary to blow off the expensive steam or operate the entire plant under reduced load. Instead, the $SO_3$ and the heat produced can be shifted into the cooling circuit.

The process described can primarily be used in the double absorption process on the basis of the combustion of sulfur, but it can likewise be used for processing metallurgical waste gases.

LIST OF REFERENCE NUMERALS 1 plant
2 supply conduit
3 primary absorber
4 supply conduit
5 sump
6 pump
7 heat exchanger
8 conduit
9 gas conduit
10 secondary absorber
11 conduit
12 common pump tank
13 pump
14 drying tower
15 final absorber
16 bypass conduit
17 control valve

The invention claimed is:

1. A process for producing sulfuric acid by catalytic oxidation of $SO_2$ to $SO_3$ and subsequent absorption of $SO_3$ in sulfuric acid, comprising
   introducing the $SO_3$ into a first absorption stage comprising a primary absorber and absorbing the $SO_3$ in concentrated sulfuric acid;
   passing the sulfuric acid having a higher concentration due to the absorption through a heat exchanger and cooling and;
   supplying the non absorbed $SO_3$ to a second absorption stage comprising a secondary absorber for further absorption into sulfuric acid,
   wherein before the primary absorber, a partial stream of $SO_3$ is branched off and supplied directly to another absorber.

2. The process as claimed in claim 1, wherein at least part of the sulfuric acid stream cooled in the heat exchanger is recirculated to the first absorption stage.

3. The process as claimed in claim 2, wherein the sulfuric acid stream recirculated to the first absorption stage is diluted with process water.

4. The process as claimed in claim 1, wherein air or $SO_2$ gas is dried in a drying tower by means of sulfuric acid, wherein the drying tower is operated with the same sulfuric acid concentration as the absorbers.

5. The process as claimed in claim 4, wherein the absorbers and the drying tower are supplied with sulfuric acid by a common storage tank.

6. A plant for producing sulfuric acid by catalytic oxidation of $SO_2$ to $SO_3$ and subsequent absorption of $SO_3$ in sulfuric acid, comprising
   a $SO_3$ supply conduit,
   a primary absorber, to which gaseous $SO_3$ and concentrated sulfuric acid are supplied, and
   a secondary absorber, to which the $SO_3$ not absorbed in the primary absorber is supplied for the further absorption in sulfuric acid,
   wherein a bypass conduit which is branched off from the $SO_3$ supply conduit before the primary absorber is coupled to the secondary absorber, in order to directly supply thereto a partial stream of $SO_3$.

7. The plant as claimed in claim 6, wherein the bypass conduit includes a valve for adjusting the partial stream of $SO_3$ passed by the primary absorber.

8. The plant as claimed in claim 6, wherein the absorbers and a drying tower for drying air by means of sulfuric acid are coupled to a common storage tank for supplying sulfuric acid.

* * * * *